Aug. 13, 1940.　　　　R. J. SMITH　　　　2,211,083
BOAT TRAILER
Filed Dec. 9, 1938　　　　2 Sheets-Sheet 1
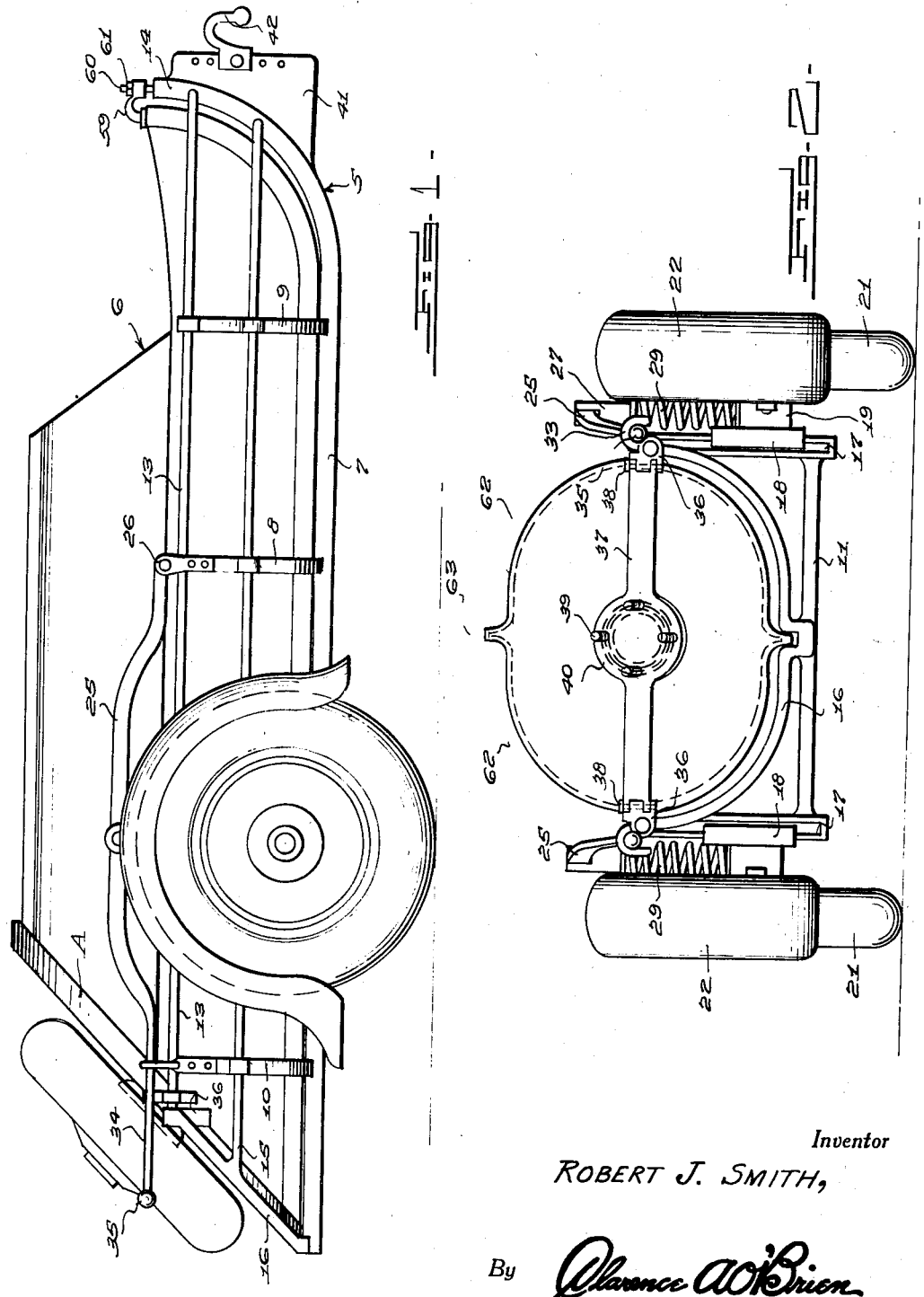
Inventor
ROBERT J. SMITH,
By Clarence A. O'Brien
and Hyman Berman
Attorneys Aug. 13, 1940.       R. J. SMITH       2,211,083
BOAT TRAILER
Filed Dec. 9, 1938       2 Sheets-Sheet 2

Inventor
ROBERT J. SMITH,
By Clarence A. O'Brien
and Hyman Berman
Attorneys

Patented Aug. 13, 1940

2,211,083

UNITED STATES PATENT OFFICE 2,211,083

BOAT TRAILER

Robert J. Smith, Greenville, Calif.

Application December 9, 1938, Serial No. 244,856

3 Claims. (Cl. 280—124)

This invention appertains to new and useful improvements in trailer boats and more particularly to a collapsible boat and wheeled carriage therefore which can be readily coupled to an automobile and pulled from one point to another without difficulty.

The principal object of the present invention is to provide a trailer boat wherein the boat proper is of collapsible construction so that it can be placed in a limited spatial position.

Another important object of the invention is to provide a boat trailer wherein the carriage is of such construction as to retain the boat proper in a snug and damage-proof position.

Still another object of the invention is to provide a trailer boat wherein the boat proper is of sectional and foldable construction wherein definite packing means is provided to insure leak-proof joining of the sections when the boat is to be put to use.

These and various other important objects and advantages of the invention will become apparent to the reader of the following specification.

In the drawings:

Figure 1 represents a side elevational view of the trailer boat with the boat in collapsed condition.

Figure 2 is a rear end elevational view.

Figure 3:
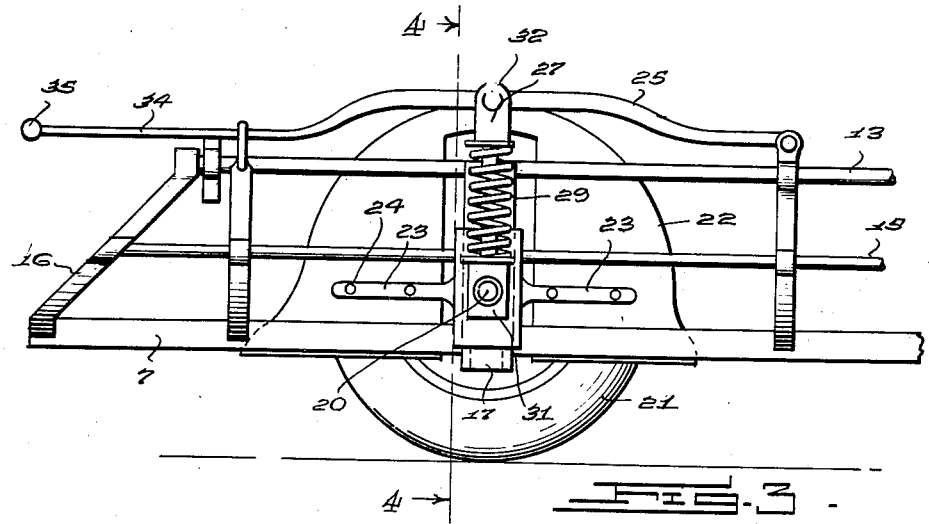
Figure 3 is a side elevational view of the carriage without the boat and with one wheel removed.

Referring to the drawings wherein like numerals designate like parts, it can be seen that numeral 5 generally refers to the carriage while numeral 6 generally refers to the sectional boat.

The carriage consists of the elongated central bar 7 laterally from which extend the frame structures 8, 9, 10 and 11 from each side thereof and each of these frames has an arcuate-shaped boat-supporting rib 12 at its upper portion which is welded or otherwise secured at its upper end to the top side rails 13—13, which connect at the upper portion of the bow end of the bar 7, which is curved upwardly as at 14.

A second pair of rails 15—15 is provided and these extend through the enlarged portions 16 at the intermediate portions of the ribs 12.

Forwardly inclined bars 16 extend from the center bar 7 upwardly to connect the rear ends of the rails 15 and 13 at each side of the carriage.

Figure 4:
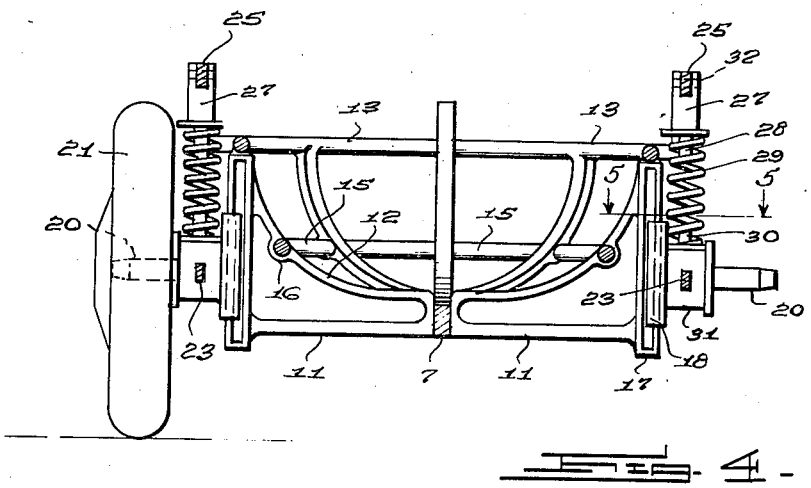
Figure 4 is a sectional view on line 3—3 of Figure 3.
Figure 5:
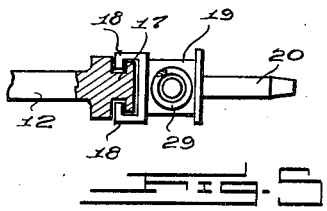
Figure 5 is a sectional view on line 5—5 of Figure 4.

As is shown in Figure 4, the outer ends of the frames 11—11 are provided with the vertically extending guide structures 17 vertically channelled on their front and rear sides to receive the inturned flanges 18 of the wheel blocks 19. Thus the wheel blocks are slidably connected to the frames 11 and each wheel block has a stub axle 20 extending therefrom and on which is the corresponding pneumatic wheel 21.

A mudguard 22 is provided for each of the wheels 21 and these mudguards are held in place by the arms 23—23 which project forwardly and rearwardly from each block 19 and to which the mudguard 22 is secured by rivets or the like 24.

From the upper ends of the frames 8 extend the rearwardly disposed arms 25, these arms being pivotally connected at their forward ends as at 26 to the upper portions of the frames 8 while the intermediate portions of these arms 25 extend into the bifurcated upper portions of the plungers 27, the lower ends of which have pintles 28 extending downwardly into the upper edge convolutions of coiled compressible springs 29. The lower ends of these coiled compressible springs 29 receive the short pintles 30 rising from the axle blocks 31. A pin 32 is disposed through the upper portion of each of the plungers 27 and through the corresponding arm 25 for pivotally connecting the arm to the plunger.

The rear frames 10 have at their upper ends hook members 33 under which the rear reduced end portions 34 of the arms 25 can be disposed. The rear end of each of these arms 25 is provided with a ball-shaped handle 35.

A block 36 is provided on the rear end of each of the rails 13 and a cross-bar 37 is adapted to bridge these blocks 36, these blocks and the adjacent end portions of the bar 37 being formed with interlapping hinge connections through which removable pins 38 can be disposed. This bar 37 serves as a wheel carrier, the same having threaded members 39 disposed from the enlarged intermediate portion 40 to accommodate a wheel as shown in Figure 1.

A fin-like formation 41 projects forwardly from the curved forward portion 14 of the bar 7 and has the coupling arm 42 projecting therefrom.

As shown in Figure 1 an arm 59 is carried by the upper end of the curved portion 14 of the center bar 7 and can be disposed on top of the bow of the boat to hold the boat from moving in its carriage. This arm 59 has the upstanding threaded member 60 extending therethrough and this threaded member is equipped with a nut 61.

It is also preferable that a cover A be employed at the open ends of the boat sections suitably flanged so that it can be slipped over the open ends of the boat sections to provide a closure. This cover A is constructed in a suitable manner to follow the contour of the boat sections in the manner substantially shown in Figure 2.

While the foregoing specification sets forth the invention in specific terms, it is to be understood hat numerous changes in the shape, size and materials may be resorted to without departing from the spirit and scope of the invention as claimed hereinafter.

Having described the invention what is claimed as new is:

1. A boat trailer comprising a cradle-like structure, a pair of stub axles, wheels for the stub axles, vertical slidable connections between the stub axles and the cradle-like structure, a pair of swingable hand bars on the cradle-like structure, compression spring structures between the stub axles and the hand bars, and detent means between the free end portions of the hand bars and the cradle-like structures.

2. A boat trailer comprising a cradle-like structure, a pair of stub axles, wheels for the stub axles, vertical slidable connections between the stub axles and the cradle-like structure, a pair of swingable hand bars on the cradle-like structure, compression spring structures between the stub axles and the hand bars, and detent means between the free end portions of the hand bars and the cradle-like structures, each of said vertically slidable connections consisting of a block formation from which the stub axle projects, a T-shaped bar extending vertically on the cradle-like structure, and a channeled member carried by the block and slidably engaged with the T-shaped structure.

3. A boat trailer comprising a cradle-like structure, a pair of stub axles, wheels for the stub axles, vertical slidable connections between the stub axles and the cradle-like structure, a pair of swingable hand bars on the cradle-like structure, compression spring structures between the stub axles and the hand bars, and detent means between the free end portions of the hand bars and the cradle-like structures, said vertically slidable connection for each of the stub axles consisting of a vertical bar of T-shaped cross section and a channeled member for riding engagement with the said bar.

ROBERT J. SMITH.